(12) United States Patent
Wynnik et al.

(10) Patent No.: US 11,233,365 B2
(45) Date of Patent: Jan. 25, 2022

(54) SYSTEMS AND METHODS FOR BUSWAY BRIDGE JOINT MAINTENANCE

(71) Applicant: Eaton Intelligent Power Limited, Dublin (IE)

(72) Inventors: Michael Anthony Wynnik, Pelzer, SC (US); Gordon Stanley Pettersen, Greenwood, SC (US)

(73) Assignee: Eaton Intelligent Power Limited, Dublin (IE)

( * ) Notice: Subject to any disclaimer, the term of this patent is extended or adjusted under 35 U.S.C. 154(b) by 143 days.

(21) Appl. No.: 16/594,588

(22) Filed: Oct. 7, 2019

(65) Prior Publication Data

US 2020/0036145 A1  Jan. 30, 2020

Related U.S. Application Data

(63) Continuation of application No. 15/648,087, filed on Jul. 12, 2017, now Pat. No. 10,439,342.

(51) Int. Cl.
| | |
|---|---|
| *H01R 4/60* | (2006.01) |
| *H01R 25/00* | (2006.01) |
| *H01R 25/16* | (2006.01) |
| *H02G 5/00* | (2006.01) |
| *H01R 25/14* | (2006.01) |
| *H02G 5/02* | (2006.01) |

(52) U.S. Cl.
CPC ............ *H01R 25/162* (2013.01); *H02G 5/002* (2013.01); *H02G 5/007* (2013.01); *H01R 25/145* (2013.01); *H02G 5/025* (2013.01)

(58) Field of Classification Search
CPC ........ H01R 25/162; H02G 5/002; H02G 5/00; H01G 5/007
See application file for complete search history.

(56) References Cited

U.S. PATENT DOCUMENTS

| | | | | |
|---|---|---|---|---|
| 3,365,537 | A * | 1/1968 | Fehr, Jr. ................. | H02G 5/007 174/88 B |
| 5,760,339 | A * | 6/1998 | Faulkner .............. | H01R 25/162 174/88 B |
| 5,785,542 | A * | 7/1998 | Johnson ............... | H01R 25/162 439/210 |
| 6,180,885 | B1 * | 1/2001 | Goldman ................. | H02G 5/06 174/68.2 |
| 7,862,356 | B1 * | 1/2011 | O'Leary ................ | H02G 5/007 439/213 |
| 8,033,850 | B2 * | 10/2011 | O'Leary ................ | H02G 5/007 439/213 |
| 8,926,351 | B2 * | 1/2015 | O'Leary ............. | H01R 25/162 439/213 |
| 9,071,028 | B2 * | 6/2015 | Falk ....................... | H01G 4/228 |

(Continued)

*Primary Examiner* — Abdullah A Riyami
*Assistant Examiner* — Thang H Nguyen
(74) *Attorney, Agent, or Firm* — Myers Bigel, P.A.

(57) ABSTRACT

A bridge joint assembly for use with a busway system includes a plurality of insulator assemblies, a bolt holding the insulator assemblies in a stack, a housing enclosing the insulator assemblies, a seal surrounding the bolt, and a bolt access system extending from a wall of the housing to the seal. The bolt includes a bolt head protruding from the stack. The bolt access system defines a bolt access passageway that provides access to the bolt head from outside the housing.

19 Claims, 11 Drawing Sheets

(56) References Cited

U.S. PATENT DOCUMENTS

| | | | |
|---|---|---|---|
| 2005/0233625 A1* | 10/2005 | Faulkner | H02G 5/007 |
| | | | 439/210 |
| 2010/0012375 A1* | 1/2010 | Jur | H02G 5/007 |
| | | | 174/88 B |
| 2011/0132635 A1* | 6/2011 | Lesieur | H02G 5/007 |
| | | | 174/68.2 |
| 2013/0171850 A1* | 7/2013 | Mooney | H02G 5/007 |
| | | | 439/213 |
| 2014/0141636 A1* | 5/2014 | O'Leary | H01R 25/162 |
| | | | 439/213 |
| 2015/0365048 A1* | 12/2015 | Martin | H02S 40/32 |
| | | | 136/251 |
| 2016/0036150 A1* | 2/2016 | Campbell-Brown | |
| | | | B41J 2/17543 |
| | | | 439/77 |
| 2016/0156169 A1* | 6/2016 | Jaena | H02G 5/007 |
| | | | 439/213 |
| 2016/0329671 A1* | 11/2016 | Kokenda | H01R 25/145 |
| 2019/0020159 A1* | 1/2019 | Wynnik | H02G 5/002 |

* cited by examiner

SYSTEMS AND METHODS FOR BUSWAY BRIDGE JOINT MAINTENANCE

RELATED APPLICATIONS

This is a continuation of U.S. application Ser. No. 15/648,087, filed on Jul. 12, 2017, the disclosure of which is incorporated by reference in its entirety.

BACKGROUND

Busway systems typically include several elongated busway sections with busway joints or bridge joints between adjacent busway sections. The busway joint serves to electrically and mechanically connect the adjacent busway sections. The busway joint may include a plurality of insulator assemblies that are held together in a stacked relationship by hardware including a bolt. The insulator assemblies may be enclosed by a cover or housing. It may be desirable to access to the bolt for periodic maintenance and/or tightening.

FIELD

The present invention is related to busway bridge joints and, more specifically, to busway bridge joint assemblies incorporating a bolt access system for accessing a bolt associated with the busway bridge joint.

SUMMARY

Some embodiments of the invention are directed to a bridge joint assembly for use with a busway system including a plurality of insulator assemblies, a bolt holding the insulator assemblies in a stack, a housing enclosing the insulator assemblies, a seal surrounding the bolt, and a bolt access system extending from a wall of the housing to the seal. The bolt includes a bolt head protruding from the stack. The bolt access system defines a bolt access passageway that provides access to the bolt head from outside the housing.

In some embodiments, the housing and the bolt access system define an internal cavity. A volume of the internal cavity outside the stack may be substantially filled with encapsulating material.

In some embodiments, the bolt access system includes a bolt access member including an elongated portion and a flange portion. The flange portion may be coupled to the wall of the housing. An entrance opening may be defined in the flange portion. The elongated portion may define the bolt access passageway that may communicate with the entrance opening. The elongated portion may include a first end portion and an opposite second end portion. The seal may define a seal channel. The second end portion of the elongated portion may be received in the seal channel.

In some embodiments, the bolt access system is integrated with the housing.

In some embodiments, the bolt access system includes first and second elongated members each including a first and end portion and an opposite second end portion. The first end portion of the first elongated member may be at the wall of the housing. The second end portion of the second elongated member may be received in or adjacent the seal. One of the first and second elongated members may be received in the other one of the first and second elongated members. The first elongated member and the second elongated member may be configured to be in sliding engagement with one another. A locking mechanism may be configured to engage the first elongated member and/or the second elongated member to hold the first elongated member and/or the second elongated member in place. A seal system may be between the first and second elongated members. A spring may be between the first and second elongated members.

In some embodiments, a respective insulator assembly includes: an insulator plate having first and second opposing primary faces; a first splitter plate on the first face of the insulator plate; and a second splitter plate on the second face of the insulator plate.

In some embodiments, the bridge joint assembly includes a plug adjacent the wall of the housing wall to block the bolt access passageway.

Some other embodiments of the invention are directed to a method for accessing a busway bridge joint fastener. The method includes: installing a bridge joint housing around a busway bridge joint stack assembly including a plurality of insulator assemblies held together in a stack by a fastener that includes a fastener head protruding from the stack; installing a fastener access system that extends from a wall of the housing to a seal that surrounds the fastener adjacent the fastener head; inserting an encapsulating material into an internal cavity defined by the housing and the fastener access system; and then accessing the fastener head from outside the housing through a fastener access channel defined by the fastener access system.

In some embodiments, the fastener access system includes a fastener access member including an elongated portion having first and second opposite end portions and a flange portion at the first end portion of the elongated portion. Installing the fastener access system may include placing the second end portion of the elongated portion through an aperture defined in the wall of the housing, then placing the second end portion of the elongated portion in the seal, and then coupling the flange to the wall of the housing.

In some embodiments, the fastener access system comprises a first elongated member having first and second end portions and a second elongated member having first and second end portions. Installing the fastener access system may include receiving the second end portion of the second elongated member in the seal and coupling the first end portion of the first elongated member to the wall of the housing. One of the first and second elongated members may be received in the other one of the first and second elongated members.

Some other embodiments of the invention are directed to a bridge joint assembly for use with a busway system. The assembly includes a plurality of electrically insulating plates and a plurality of electrically conductive plates held together in a stack by hardware including a bolt having a bolt head that protrudes from the stack, a seal surrounding the bolt, a joint housing configured to enclose the stack, and a bolt access system configured to extend from a wall of the housing to the seal to define a bolt access passageway that provides access to the bolt head from outside the housing.

In some embodiments, the bolt access system includes an elongated member having first and second opposite end portions. The second end portion may be configured to be received through an aperture in the wall of the housing and then received in the seal with the first end portion at the wall of the housing. The first end portion may be configured to couple to the wall of the housing.

In some embodiments, the bolt access system includes a first elongated member having a first end portion and an opposite second end portion and a second elongated member having a first end portion and an opposite second end portion. The first end portion of the first elongated member may be at the wall of the housing. The second end portion of the second elongated member may be configured to be received in the seal. One of the first and second elongated members may be configured to be received in the other one of the first and second elongated members. The first end portion of the first elongated member is may optionally be configured to couple to the wall of the housing.

In some embodiments, the bridge joint assembly is in combination with a first busway section including a plurality of bus bar conductors and a second busway section including a plurality of bus bar conductors. The bus bar conductors of the first busway section and the bus bar conductors of the second busway section may be received in gaps defined in the stack to electrically connect the first and second busway sections.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Figure 1:
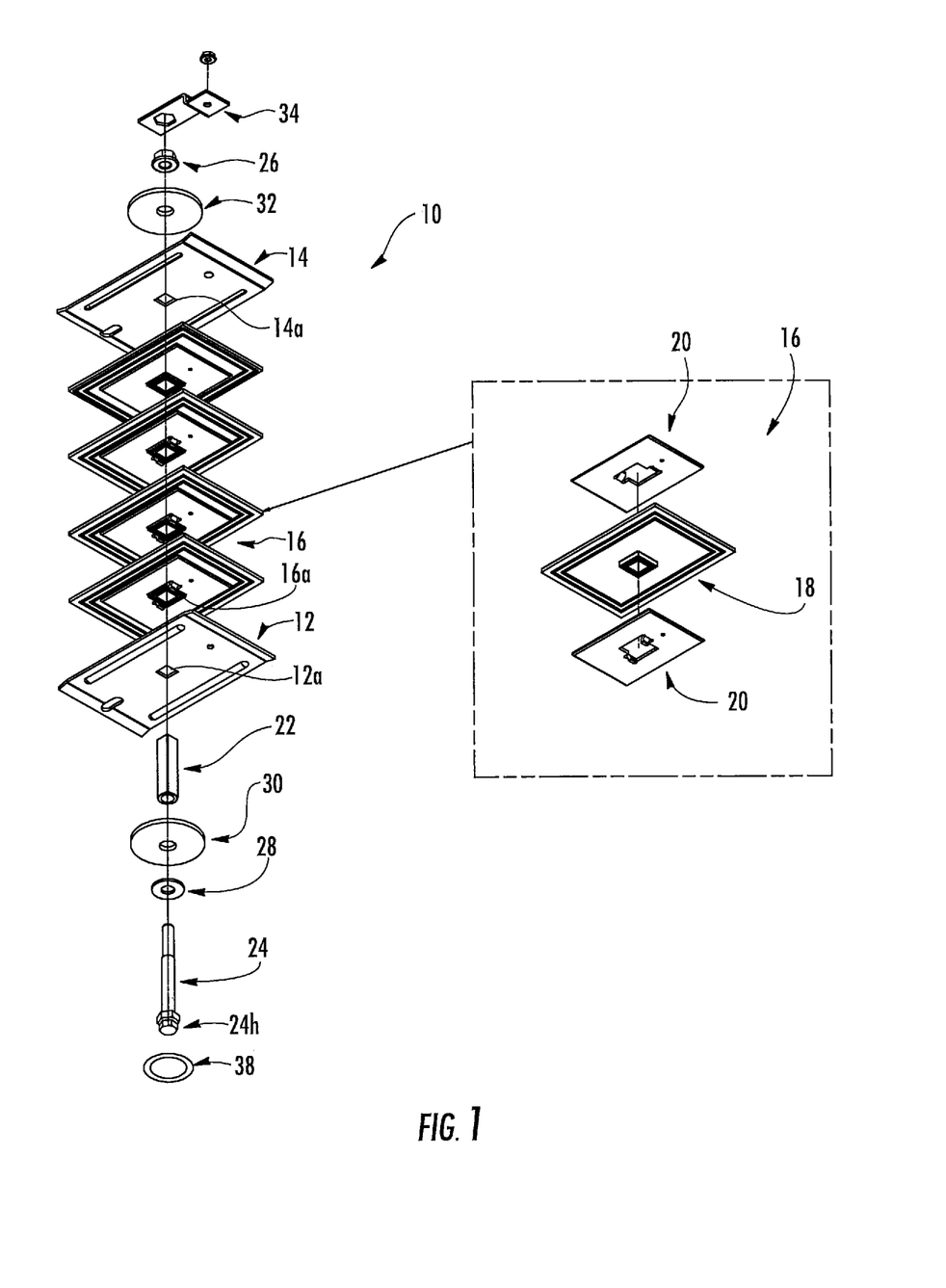
FIG. 1 is an exploded view of a busway joint stack assembly according to some embodiments.
Figure 2:
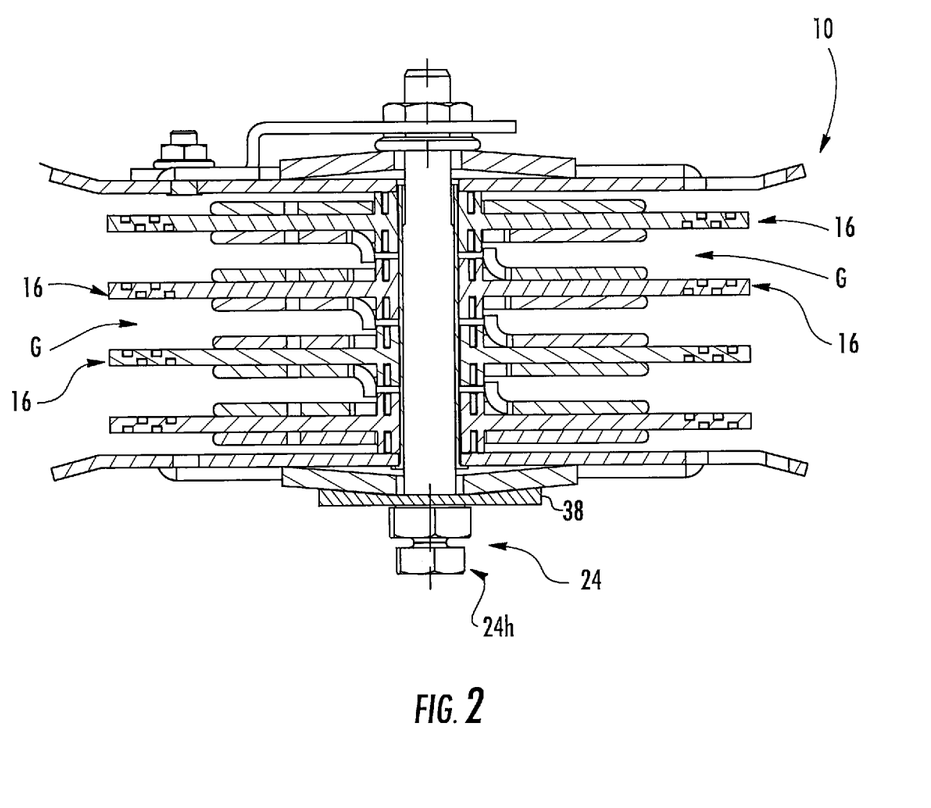
FIG. 2 is an assembled view of the busway joint stack assembly of FIG. 1.

A bridge joint stack assembly 10 (also known as a busway joint stack assembly) according to some embodiments is illustrated in FIGS. 1 and 2. The assembly 10 may include a first or lower bridge plate 12 and a second or upper bridge plate 14. The assembly 10 may include a plurality of insulator assemblies 16. Each insulator assembly 16 may include an insulator plate 18 and a splitter plate 20 on each opposing primary side or surface of the insulator plate 20. The insulator plate 18 is formed of an electrically insulating material and the splitter plates 20 are formed of an electrically conductive material.

The bridge plates 12, 14 and the insulator assemblies 16 are held together in a stacked relationship by a set of hardware. For example, referring to FIG. 1, the hardware may include a bridge alignment tube 22 that extends through the stack (e.g., through apertures 12a, 14a, and 16a in the lower bridge plate 12, the upper bridge plate 14, and the insulator assemblies 16, respectively). An elongated fastener such as a bolt 24 may extend through the bridge alignment tube 22 and, together with additional hardware such as flange nut 26, serves to hold the bridge plates 12, 14 and the insulator assemblies 16 in the stacked relationship. The fastener or bolt 24 includes a fastener head or bolt head 24h. It will be appreciated that the fastener 24 may be any elongated fastener configured to help hold the bridge plates and/or the insulator assemblies together in a stacked relationship. For example, the fastener 24 may be a bolt, screw, or rod.

Referring to FIG. 1, additional hardware that may be used include a flat washer 28, a first or lower Belleville washer 30, a second or upper Belleville washer 32, and/or a locking plate 34 that connects to the upper bridge plate 14. It will be appreciated that other hardware arrangements may be used to hold the stack together as understood by those of ordinary skill in the art.

The assembly 10 may further include a gasket or seal 38. The gasket or seal 38 is described in more detail below.

It will be understood by those of ordinary skill in the art that the stack assembly may be a "single mod" configuration and may have two bolts such as two of the bolts 24 described above. It will also be understood by those of ordinary skill in the art that the stack assembly may be a "double mod" configuration and may have up to four bolts such as four of the bolts 24 described above.

FIG. 2 illustrates the bridge joint stack assembly 10 with the bridge plates 12, 14 and the insulator assemblies 16 held together in a stack. Gaps G are defined by adjacent ones or neighboring pairs of the insulator assemblies 16. Each gap G is configured to receive a bus bar conductor from a busway section or busway run.

Figure 3:
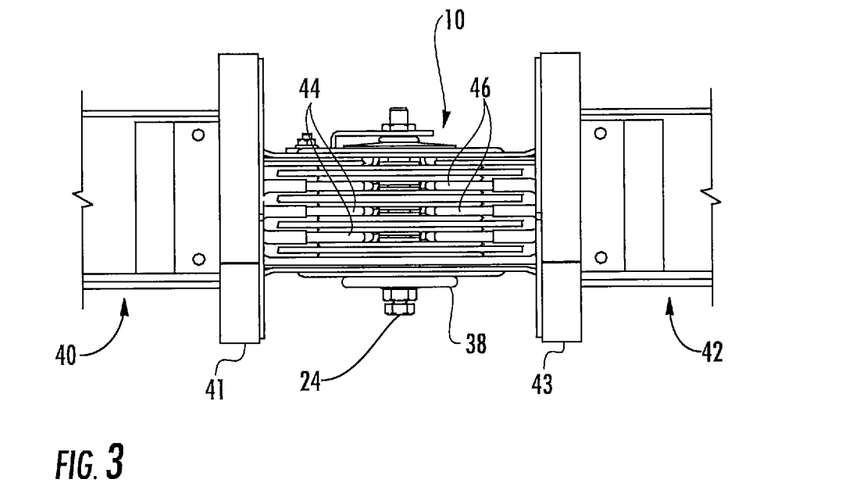
FIG. 3 is a side view of the busway joint stack assembly of FIG. 1 between two busway sections.

This is illustrated in FIG. 3 which shows first and second busway sections 40, 42 joined by the bridge joint stack assembly 10. Referring to FIGS. 2 and 3, bus bar conductors 44 of the busway section 40 and bus bar conductors 46 of the busway section 42 are received in the gaps G defined by the insulator assemblies 16. In this regard, the busway sections 40, 42 are electrically coupled by the bridge joint stack assembly 10. Once the busway sections 40, 42 have been properly aligned and positioned, the bolt 24 is tightened to the appropriate torque.

After the joint bolt is tightened with the proper torque, a joint cover or housing may be installed. Joint covers help prevent incidental contact with energized conductors and connect a portion of the housing ground path between the two sections of busway. In addition, the joint cover may provide structural support for the joint. Further, for outdoor busway systems, the cover may provide protection from weather and/or debris.

Figure 4:
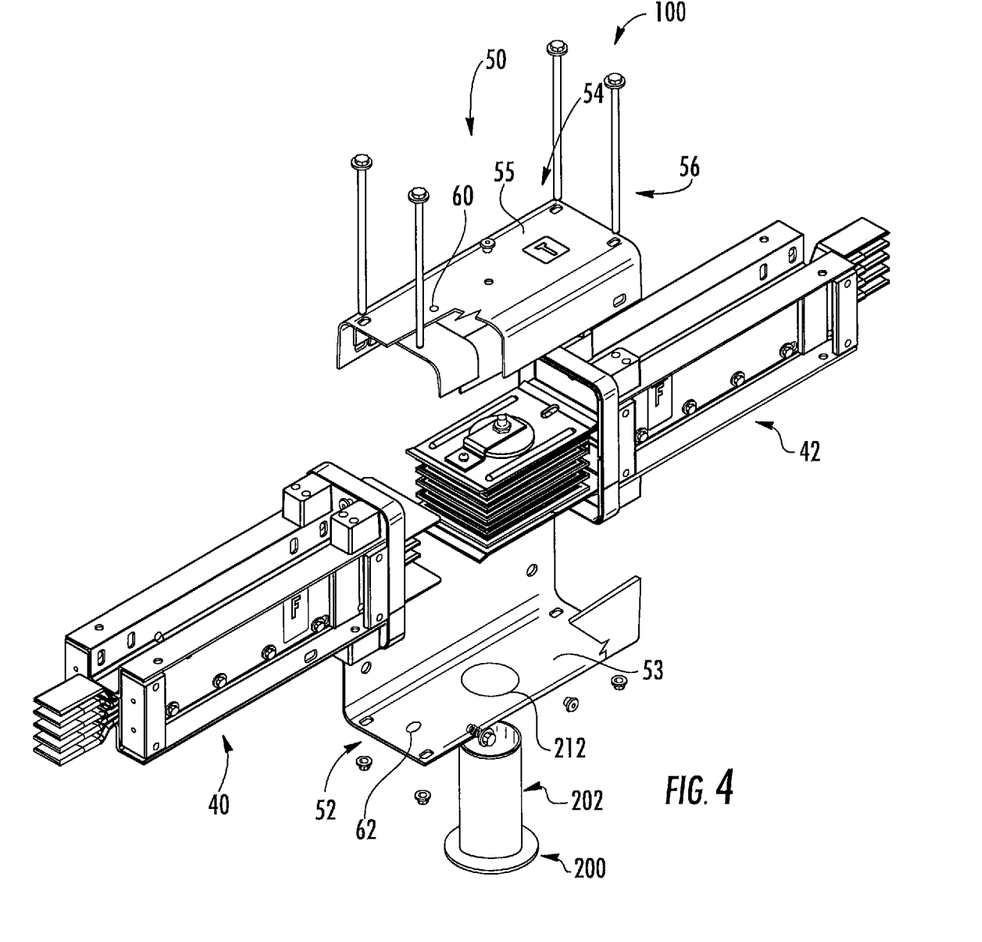
FIG. 4 is a partially exploded, perspective view of a busway system including a bolt access system according to some embodiments.
Figure 5:
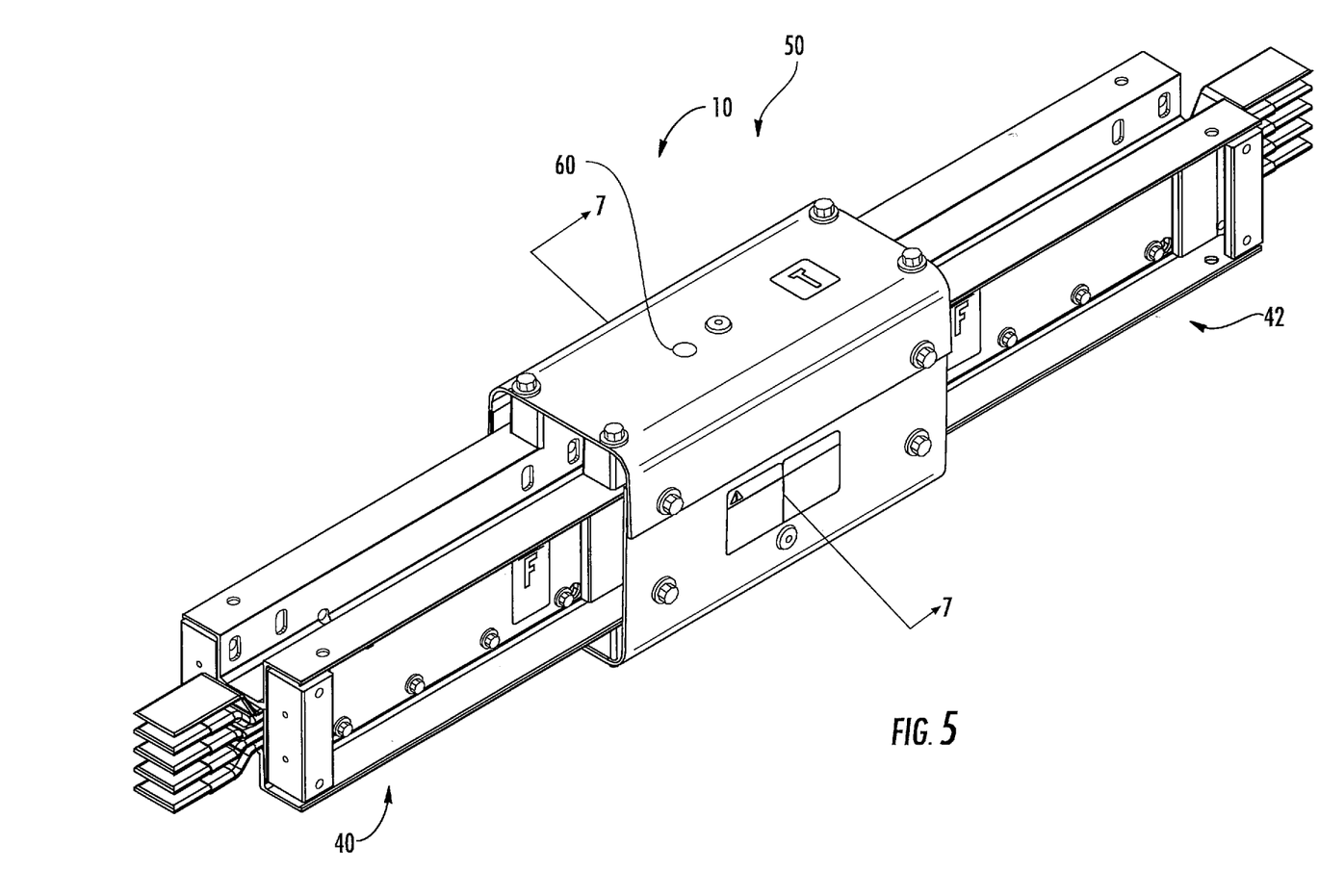
FIG. 5 is an assembled, perspective view of the busway system of FIG. 4.

A busway assembly or busway system 100 is illustrated in FIG. 4. The system 100 includes the bridge joint stack assembly 10 and the first and second busway sections 40, 42. The system 100 further includes a bridge joint cover or housing 50 that is used to cover and/or enclose the bridge joint stack assembly 10 when the first and second busway sections 40, 42 are coupled as shown in FIG. 3.

As illustrated, the cover or housing 50 includes a first or lower cover or housing portion 52 and a second or upper cover or housing portion 54. The lower housing portion 52 may be first coupled to the first and second busway sections 40, 42 and then the upper housing portion 54 may be positioned over the lower housing portion 52 and coupled to the first and second busway sections 40, 42 and/or to the lower housing portion 52. Elongated fasteners 56 may extend through the upper housing portion 54, the first and second busway sections 40, 42 and/or the lower housing portion 52 to further secure the housing 50. The assembly and installation of covers or housings similar to the housing 50 is described in greater detail in commonly-owned U.S. Pat. No. 9,197,045, the disclosure of which is incorporated by reference herein in its entirety.

An aperture or opening 60 may be defined in the upper housing portion 54 (or in an upper wall 55 of the housing 50) and an aperture or opening 62 may be defined in the lower housing portion 52 (or in a lower wall 53 of the housing 50). The aperture 60 may be used as a fluid entry or pour path for introducing (e.g., injecting or pouring) encapsulant or encapsulating material into an interior cavity of the housing. The aperture 62 may be used as a purge path for purging or removing excess encapsulant or encapsulating material. The filling of the cavity with the encapsulant or encapsulating material will be described in more detail below.

For ease of description, the first housing portion 52 may be referred to herein as a "lower housing" 52 and the second housing portion 54 may be referred to herein as an "upper housing" 54. Similarly, the wall 53 may be referred to herein as a "lower wall" 53 and the wall 55 may be referred to herein as an "upper wall" 55. However, it will be understood that the first and second housing members 52, 54 may positioned in different orientations. For example, although the busway sections 40, 42 are shown as extending horizontally in the figures, it is contemplated that the busway sections 40, 42 may extend vertically. Similarly, the busway sections 40, 42 may be rotated about their longitudinal axis.

Figure 6:
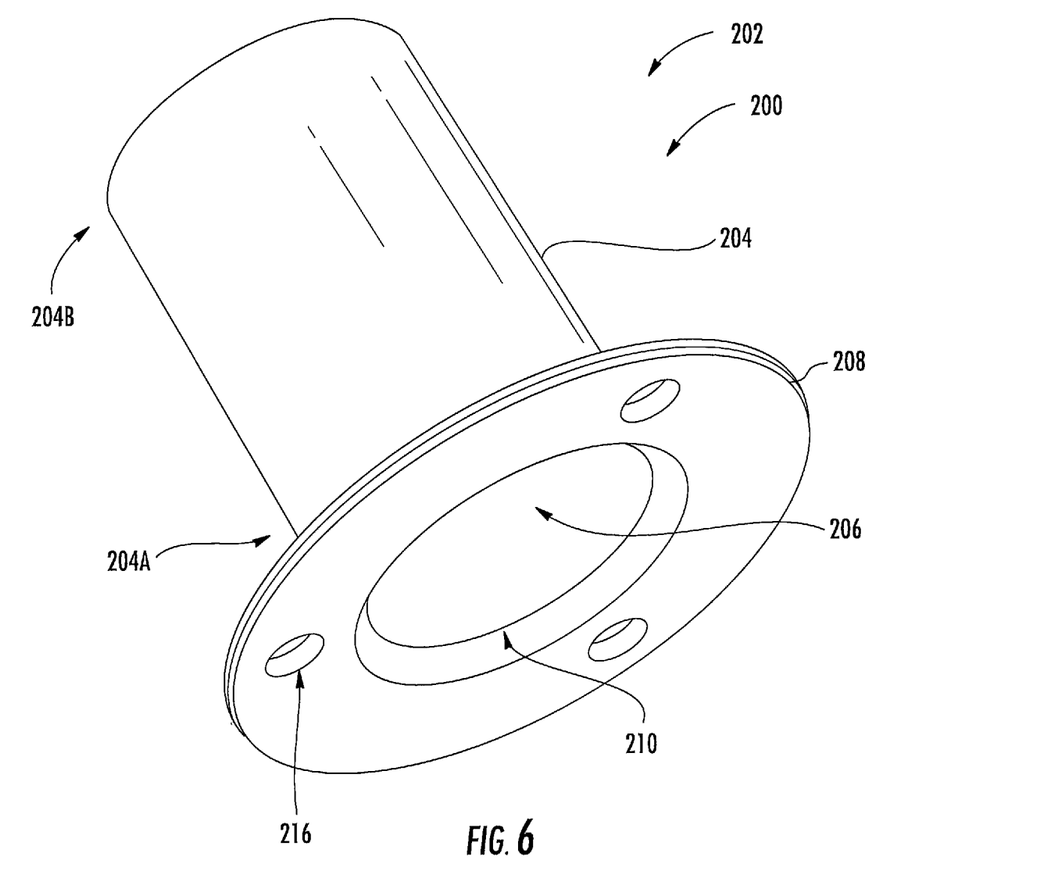
FIG. 6 is a perspective view of a bolt access system according to some embodiments.

The system 100 includes a bolt or fastener access system 200. With reference to FIGS. 4 and 6, the bolt access system 200 may include a bolt or fastener access member 202. The bolt access member 202 includes an elongated portion 204 having a first end or first end portion 204A and an opposite second end or second end portion 204B. The elongated portion 204 is hollow and may be cylindrical or tubular (although it is contemplated that the elongated portion may have a polygonal or other cross section). The elongated portion 204 defines a channel or passageway 206.

The bolt access member 202 optionally includes a flange portion 208 that extends laterally or radially away from the elongated portion 204 at the first end portion 204A thereof. The flange portion 208 defines an end opening 210 that communicates with the channel 206.

The lower portion 52 of the housing 50 may include a second aperture or opening 212 defined therein (FIG. 4). The aperture 212 may be formed in the lower wall 53 of the housing 50 (FIG. 4). The aperture 212 is sized to receive the bolt access member elongated portion 204 therethrough.

Referring to FIGS. 1-3 and 7, a gasket or seal 38 is configured to receive the second end portion 204B of the bolt access member elongated portion 204. The seal 38 may surround the bolt 24. The seal 38 may be adjacent or on the Belleville washer 30. Additionally or alternatively, the seal 38 may be adjacent or on the flat washer 28 (see, e.g., FIG. 10). It is further contemplated that the seal 38 may be adjacent or on the lower bridge plate 12 (FIG. 1).

Figure 7:
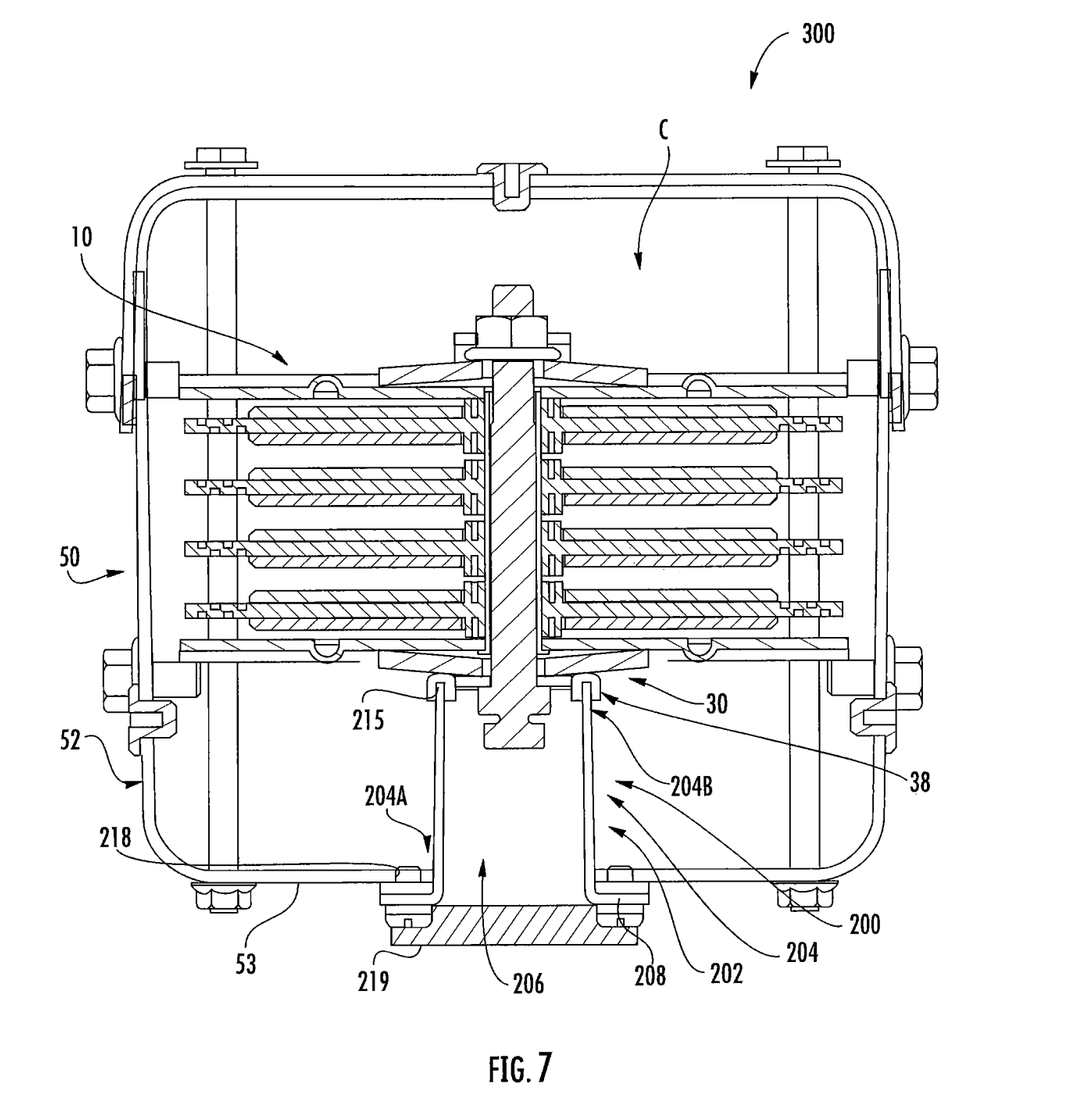
FIG. 7 is a sectional view of the busway system taken along line 7-7 of FIG. 5 including the bolt access system of FIG. 6.

The seal 38 may be formed of a flexible and/or resilient material to provide a tight seal around the second end portion 204B of the bolt access member elongated portion 204. The seal 38 may be U-shaped to receive the perimeter wall of the second end portion 204B of the bolt access member elongated portion 204. The seal may include a channel or groove 215 that is configured to receive the second end portion 204B of the bolt access member elongated portion 204. The seal 38 may surround the bolt 24 (e.g., adjacent the bolt head 24h). The seal 38 may be an annular seal (e.g., when the bolt access member elongated portion 204 is cylindrical or tubular).

A plurality of apertures 216 may be formed in the flange 208 of the bolt access member 202. The apertures 216 may be aligned with corresponding apertures 218 in the lower wall 53 of the bridge joint housing 50. Fasteners such as bolts or screws may be used in the aligned apertures to connect the bolt access member flange 208 to the bridge joint housing 50.

Where the flange portion 208 is not used, the bolt access member 202 may be a flangeless tube and include only the elongated portion 204 and may be referred to herein as a flangeless tube or an elongated member. The first end portion 204A of the elongated member 204 may be coupled to the housing 50 (e.g., at or adjacent the lower wall 53).

The bolt access member 202 (or elongated member 204) may be integrated with the bridge joint housing 50. For example, the bolt access member 202 (or elongated member 204) may be integrally formed with the lower portion 52 of the housing 50. With this configuration, the second end portion 204B of the bolt access member 202 (or elongated member 204) may be received in the seal 38 when the lower housing portion 52 is installed around the bridge joint stack assembly 10.

Figure 8:
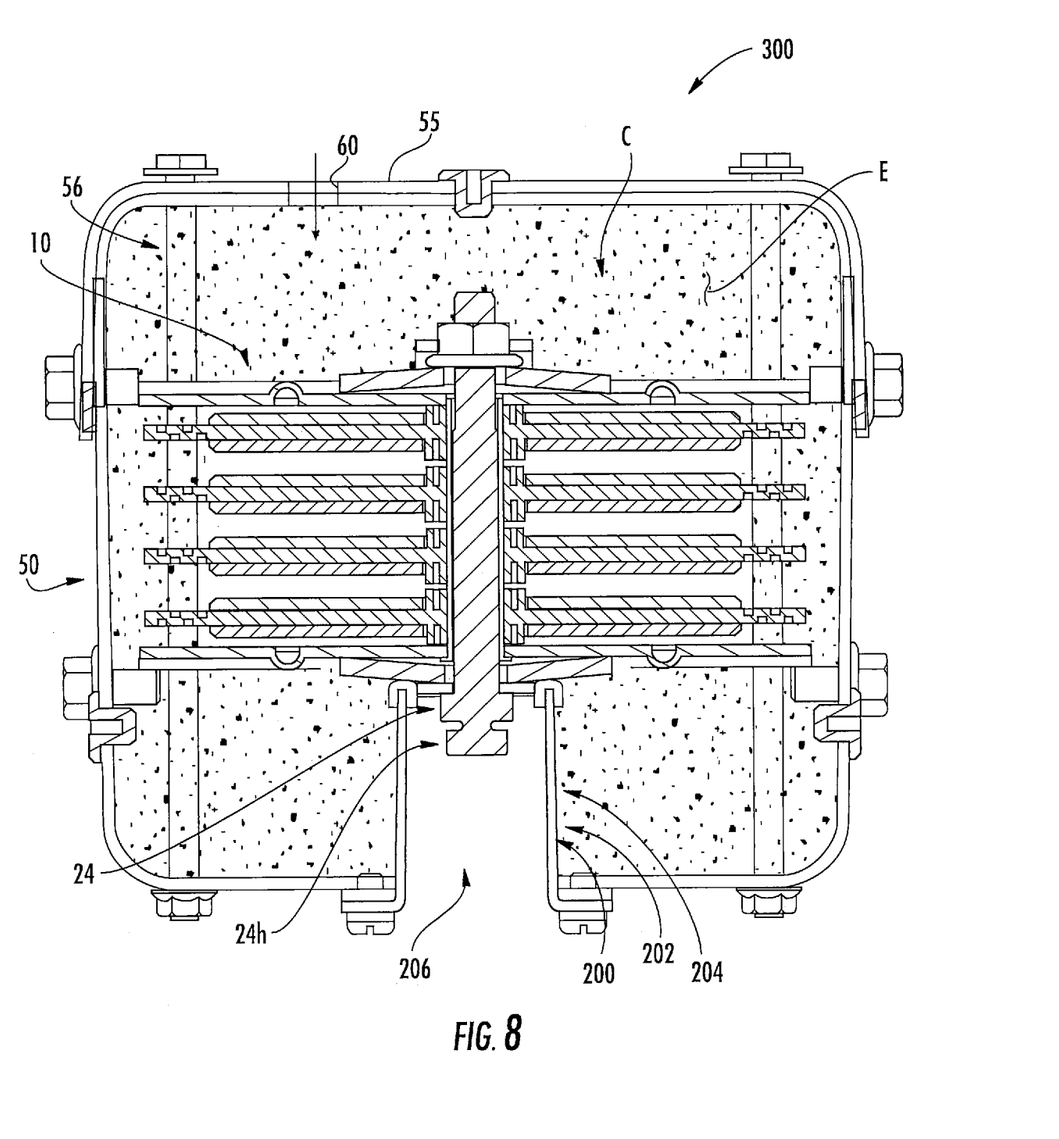
FIG. 8 is a sectional view of the busway section of FIG. 7 schematically illustrating a cavity defined by a joint housing holding encapsulating material.

FIG. 8 schematically illustrates the aperture 60 in the upper wall 55 of the housing 50. The aperture 60 may provide a fluid entry or pour path for encapsulant or encapsulating material E to be inserted into an interior cavity C defined by the housing 50 and the bolt access member (e.g., the elongated portion 204 of the bolt access member 202). The cavity C may be further defined by portions of the first and second busway sections 40, 42. For example, the cavity C may be further defined by barrier plates 41, 43 (FIG. 3) of the first and second busway sections 40, 42, respectively. As used herein, the cavity C refers to the open internal spaces enclosed by the housing 50 and/or the first and second busway sections 40, 42 and does not include the volume occupied by the stack assembly 10, the bus bar conductors 44, 46, the elongated fasteners 56 and/or any other hardware or fasteners protruding from the housing 50 and/or the first and second busway sections 40, 42.

The cavity C may be filled or substantially filled by the encapsulant or encapsulating material E. As used herein, the term "substantially filled" means that the encapsulant or encapsulating material E fills at least 80% or at least 90% of the cavity C in various embodiments.

The encapsulant or encapsulating material E may provide improved moisture protection (e.g., weather proofing) and/or electrical insulation for the bridge joint stack assembly 10. The encapsulant or encapsulating material E may be polymeric. The encapsulant or encapsulating material E may be a thermoset or thermoplastic material. The encapsulant or encapsulating material E may be or include urethane or polyurethane. Other suitable materials for the encapsulant or encapsulating material E may include epoxy, silicone, thermoset polyester, phenolic resin, etc.

It is desirable to provide access to the bolt of the bridge joint stack assembly. For example, it may be necessary to loosen the bolt to disassemble or otherwise adjust the bridge joint. Also, some standards require periodic tightening of the bolt. See, for example, NEMA BU1.1 entitled "General Instructions for Handling. Installation, Operation, and Maintenance of Busways Rated 600 Volts or Less."

Some known bridge joint assemblies include a bolt cover on the housing. The bolt cover is removable to provide access to the bolt. The bolt is accessible because the cavity defined by the housing is filled with air.

However, with the cavity C filled or substantially filled with encapsulant or encapsulating material E as illustrated in FIG. 8, the bolt 24 would not be accessible and/or rotatable with the known bridge joint assembly configurations. That is, the bolt 24 would be surrounded by the encapsulant or encapsulating material E.

The bolt access system 200 according to embodiments described herein solves this problem by providing the bolt access passageway 206 such that the bolt 24 and/or the bolt head 24h may be externally accessed from outside the housing 50. Therefore, the cavity C may be advantageously filled or substantially filled with the encapsulant or encapsulating material E and the bolt 24 (e.g., bolt head 24h) may then be accessed as needed for maintenance without disrupting the encapsulant E in the cavity C.

Referring to FIG. 7, a plug 219 may be provided to block or enclose the bolt access passageway 206 when access to the bolt access passageway 206 is not needed. The plug 219 may be adjacent the first end portion 204A of the bolt access member 202 and/or under a lowermost wall of the housing 50.

Figure 9:
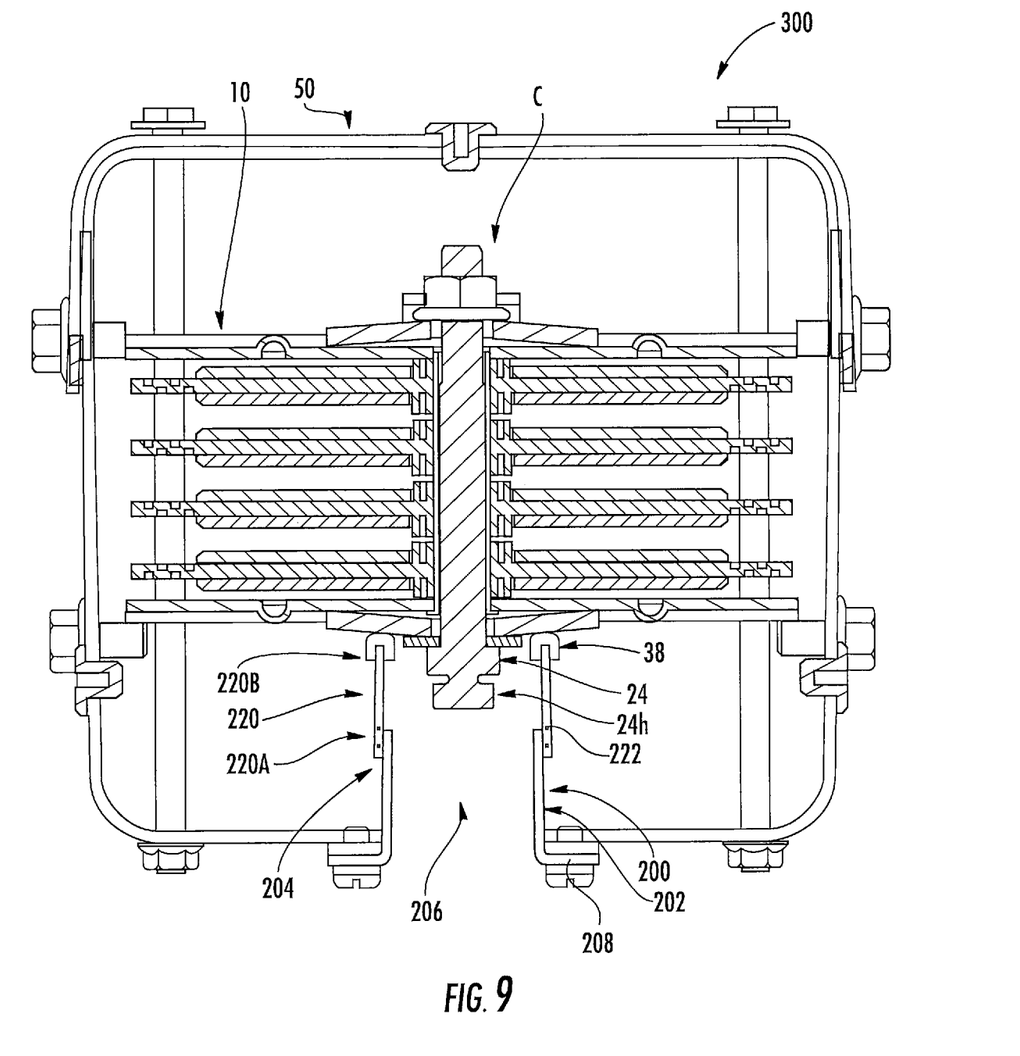
FIGS. 9-11 are sectional views of the busway section of FIG. 7 with exemplary alternative arrangements for the bolt access system according to some embodiments.
Figure 10:
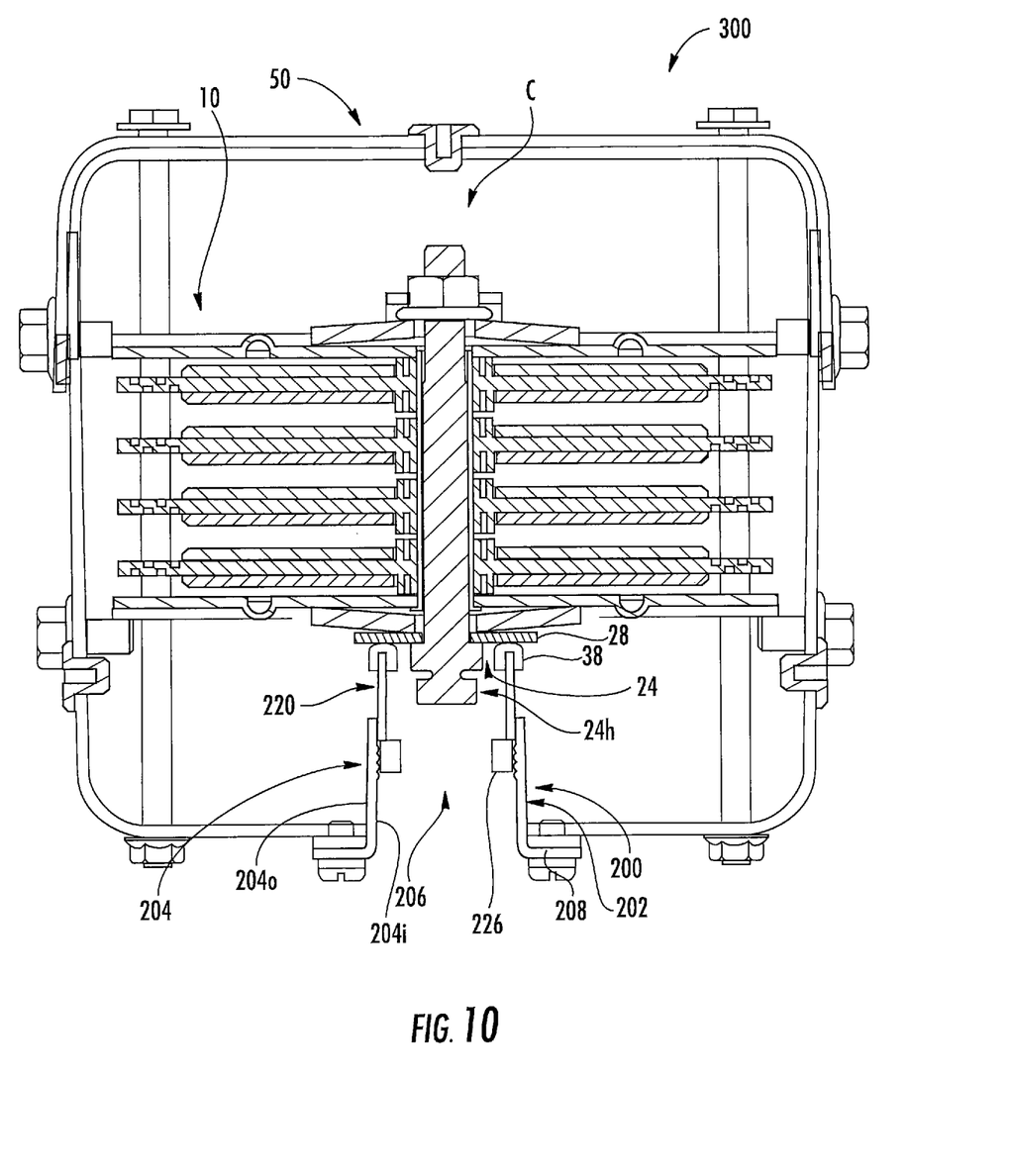
Figure 11:
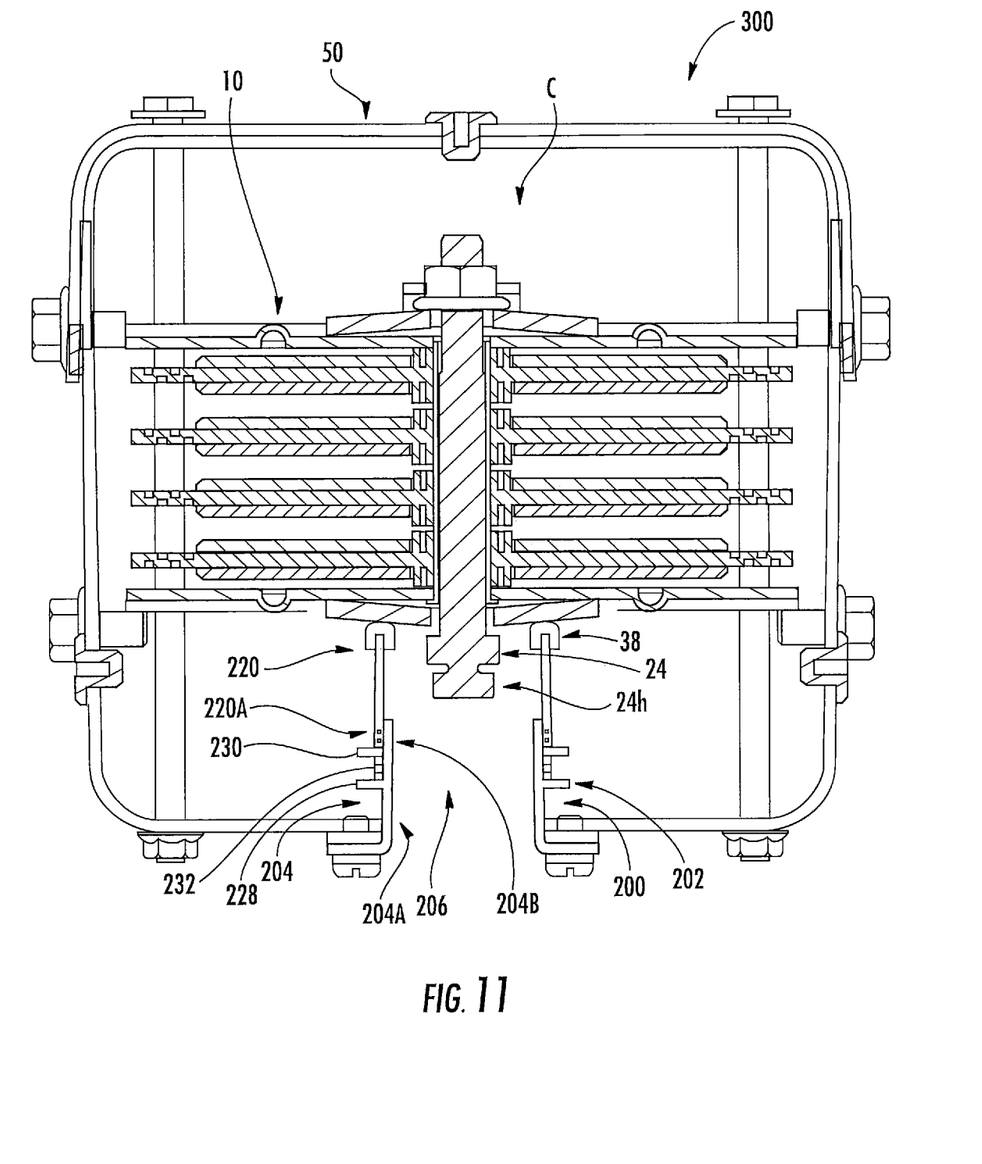

Additional embodiments of the bolt access system 200 are illustrated in FIGS. 9-11. The bolt access systems 200 in FIGS. 9-11 may be adjustable in height or length. This may be useful because busway systems and bridge joints associated therewith can be provided with different heights (e.g., three wire for busway sections having three bus bar conductors, four wire for busway sections having four bus bar conductors, etc.).

Referring first to FIG. 9, the bolt access system 200 may include the bolt access member 202 as a first bolt access member or first elongated member and a second bolt or fastener access member 220 or second elongated member. The second bolt access member 220 may have a cross sectional shape that matches that of the elongated portion 204 of the first bolt access member 202. For example, the second bolt access member 220 may be cylindrical or tubular.

The elongated portion 204 of the first bolt access member 202 and the second bolt access member 220 may be configured to slidingly engage with one another. As illustrated, the elongated portion 204 of the first bolt access member 202 is slidingly received in the second bolt access member 220, although it is contemplated that the second bolt access member 220 may be slidingly received in the elongated portion 204 of the first bolt access member 202. A seal or seal system 222 such as one or more o-rings may be provided between the elongated portion 204 of the first bolt access member 202 and the second bolt access member 220.

The elongated portion 204 of the first bolt access member 202 and the second bolt access member 220 together define the bolt access channel 206.

The second bolt access member 220 may include a first end portion 220A and a second, opposite end portion 220B. The second bolt access member 220 may be first installed in the seal 38. The first bolt access member 202, which may be coupled to or integrated with the housing 50 as described above, may then slidingly engage the second bolt access member 220 when the housing 50 is installed around the bridge joint 10. More specifically, the elongated portion 204 of the first bolt access member 202 may slidingly engage with the second bolt access member 220. The cavity C may then be filled or substantially filled with encapsulant or encapsulating material as described above. The elongated portion 204 of the first bolt access member 202 and the second bolt access member 220 may overlap so that the bolt access system 200 may be used with bridge joints of varying sizes.

Referring to FIG. 10, the first bolt access member 202 or the first bolt access member elongated portion 204 may include an inner surface 204i and an outer surface 204o. At least a portion of the inner surface 204i may be threaded. The second bolt access member 220 may be received in the first bolt access member elongated portion 204 and a locking mechanism such as a nut 226 may engage the threaded portion of the inner surface 204i to hold or lock the bolt access system 200 at the appropriate height or length. It is contemplated that at least a portion of the outer surface 204o may be threaded and the first bolt access member elongated portion 204 may be received in the second bolt access member 220. The nut 226 may then be threadingly engaged with the threaded portion of the outer surface 204o to hold or lock the bolt access system 200 at the appropriate height or length.

Referring to FIG. 11, a ledge 228 may extend laterally or radially outwardly from the first bolt access member 202 or the first bolt access member elongated portion 204 between the first and second end portions 204A, 204B thereof. A ledge 230 may extend laterally or radially outwardly from the second bolt access member 220 at the first end portion 220A thereof. A resilient member 232 such as a spring may be positioned between the ledges 228, 230. The spring 232 may surround the first bolt access member 202 or the first bolt access member elongated portion 204 above the ledge 228. The spring 232 may provide resistance and help hold the first and second bolt access members 202, 220 in engagement before and/or during the filling or substantial filling of the cavity C with encapsulant or encapsulating material.

Referring to FIGS. 8-11, a bridge joint assembly 300 may include the stack assembly 10, the housing 50 and/or the bolt access system 200.

Figure 12:
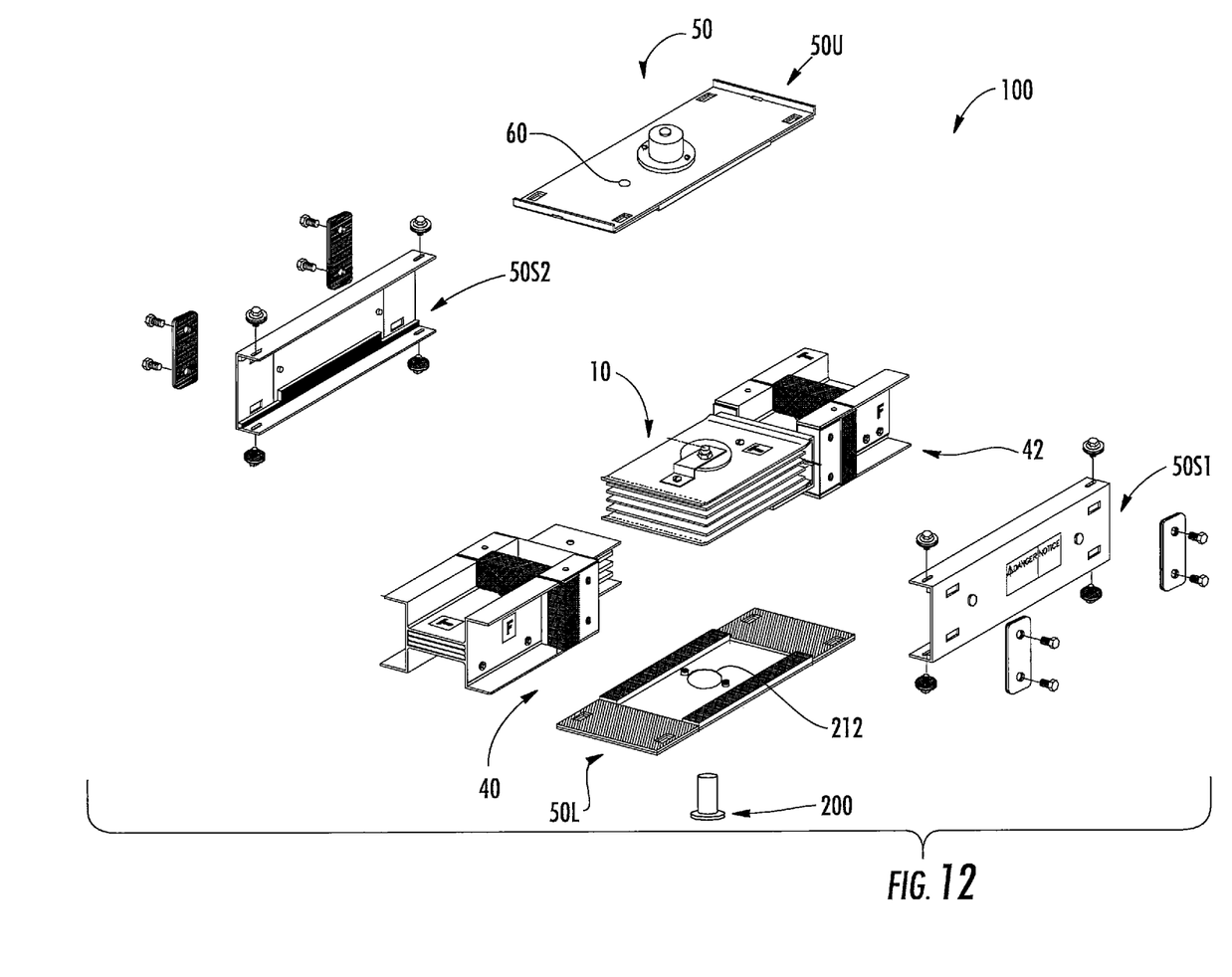
FIG. 12 is a partially exploded, perspective view of a busway system including a bolt access system according to some embodiments.

Although the bolt access system 200 has been described as being used with a two-piece housing above, other configurations are contemplated. For example, referring to FIG. 12, the bolt access system 200 may be used with a four piece cover or housing 50. The housing 50 may include an upper portion 50U, a lower portion 50L, and first and second side portions 50S1, 50S2. The housing 50 may be installed around the joint stack assembly 10 as understood by those of ordinary skill in the art. The bolt access system 200 may then be installed, for example, through the aperture 212 that is defined in the lower housing portion 50L. A cavity defined by the housing 50 and/or the first and second busway sections 40, 42 may then be filled or substantially filled with encapsulant or encapsulating material, for example through the aperture 60 that is defined in the upper housing portion 50U.

As described above, the bridge joint stack assembly may include more than one bolt such as the bolt 24 described above in reference to FIG. 1. Referring to FIG. 4, with such a configuration, a plurality of bolt access systems 200 may be used, with one bolt access system 200 for each bolt 24. In this manner, a plurality of bolt access passageways are defined, with one defined for each bolt access system 200. Alternatively, a single bolt access system 200 may be used for a plurality of bolts 24 (e.g., a single bolt access system 200 may be used for adjacent bolts 24 in the stack assembly). That is, a seal similar to the seal 38 described above may surround the plurality of bolts 24 and the bolt access member 200 may be received in the seal to define a single bolt access passageway for the plurality of bolts.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A bridge joint assembly for use with a busway system, the assembly comprising:
   a plurality of insulator assemblies;
   a fastener holding the insulator assemblies in a stack, the fastener comprising a fastener head protruding from the stack;
   a housing enclosing the insulator assemblies;
   a seal surrounding the fastener; and
   a fastener access system extending from a wall of the housing to the seal and defining a fastener access passageway that provides access to the fastener head from outside the housing to allow rotation of the fastener head.

2. The bridge joint assembly of claim 1 wherein:
   the housing and the fastener access system define an internal cavity; and
   a volume of the internal cavity outside the stack is substantially filled with encapsulating material.

3. The bridge joint assembly of claim 1 wherein:
   the fastener access system comprises a fastener access member including an elongated hollow portion and a flange portion; and
   the flange portion is coupled to the wall of the housing.

4. The bridge joint assembly of claim 3 wherein:
   the elongated portion includes a first end portion and an opposite second end portion;
   the seal defines a seal channel; and
   the second end portion of the elongated portion is received in the seal channel.

5. The bridge joint assembly of claim 1 wherein the fastener access system is integrated with the housing.

6. The bridge joint assembly of claim 1 wherein:
   the fastener access system comprises first and second elongated members each comprising a first and end portion and an opposite second end portion;
   the first end portion of the first elongated member is at the wall of the housing;
   the second end portion of the second elongated member is received in or adjacent the seal;
   one of the first and second elongated members is received in the other one of the first and second elongated members; and
   the first elongated member and the second elongated member are configured to be in sliding engagement with one another.

7. The bridge joint assembly of claim 6 further comprising a locking mechanism configured to engage the first elongated member and/or the second elongated member to hold the first elongated member and/or the second elongated member in place.

8. The bridge joint assembly of claim 6 further comprising a seal system between the first and second elongated members.

9. The bridge joint assembly of claim 6 further comprising a spring between the first and second elongated members.

10. The bridge joint assembly of claim 1 wherein a respective insulator assembly comprises:
an insulator plate having first and second opposing primary faces;
a first splitter plate on the first face of the insulator plate; and
a second splitter plate on the second face of the insulator plate.

11. The bridge joint assembly of claim 1 further comprising a plug adjacent the wall of the housing to block the fastener access passageway.

12. A method for accessing a busway bridge joint fastener, the method comprising:
installing a bridge joint housing around a busway bridge joint stack assembly including a plurality of insulator assemblies held together in a stack by a fastener that includes a fastener head protruding from the stack;
installing a fastener access system that extends from a wall of the housing to a seal that surrounds the fastener;
inserting an encapsulating material into an internal cavity defined by the housing and the fastener access system; and then
accessing the fastener from outside the housing through a fastener access channel defined by the fastener access system and rotating the fastener head.

13. The method of claim 12 wherein:
the fastener access system comprises a fastener access member including an elongated portion having first and second opposite end portions and a flange portion at the first end portion of the elongated portion; and
installing the fastener access system comprises placing the second end portion of the elongated portion through an aperture defined in the wall of the housing, then placing the second end portion of the elongated portion in the seal, and then coupling the flange to the wall of the housing.

14. The method of claim 12 wherein:
the fastener access system comprises a first elongated member having first and second end portions and a second elongated member having first and second end portions; and
installing the fastener access system comprises receiving the second end portion of the second elongated member in the seal and coupling the first end portion of the first elongated member to the wall of the housing, wherein one of the first and second elongated members is received in the other one of the first and second elongated members.

15. A bridge joint assembly for use with a busway system, the assembly comprising:
a plurality of electrically insulating plates and a plurality of electrically conductive plates held together in a stack by hardware including a fastener having a fastener head that protrudes from the stack;
a seal surrounding the fastener;
a joint housing configured to enclose the stack; and
a fastener access system configured to extend inwardly in the housing from a wall of the housing to the seal to define a fastener access passageway that provides access to the fastener from outside the housing to allow rotation of the fastener head.

16. The bridge joint assembly of claim 15 wherein the fastener access system comprises an elongated member having first and second opposite end portions, wherein the second end portion is configured to be received through an aperture in the wall of the housing and then received in the seal with the first end portion at the wall of the housing.

17. The bridge joint assembly of claim 16 wherein the first end portion is configured to couple to the wall of the housing.

18. The bridge joint assembly of claim 15 wherein:
the fastener access system includes a first elongated member having a first end portion and an opposite second end portion and a second elongated member having a first end portion and an opposite second end portion;
the first end portion of the first elongated member is at the wall of the housing;
the second end portion of the second elongated member is configured to be received in the seal;
one of the first and second elongated members is configured to be received in the other one of the first and second elongated members; and
the first end portion of the first elongated member is optionally configured to couple to the wall of the housing.

19. The bridge joint assembly of claim 15 in combination with:
a first busway section including a plurality of bus bar conductors;
a second busway section including a plurality of bus bar conductors;
wherein the bus bar conductors of the first busway section and the bus bar conductors of the second busway section are received in gaps defined in the stack to electrically connect the first and second busway sections.

* * * * *

UNITED STATES PATENT AND TRADEMARK OFFICE
CERTIFICATE OF CORRECTION

PATENT NO. : 11,233,365 B2
APPLICATION NO. : 16/594588
DATED : January 25, 2022
INVENTOR(S) : Wynnik et al.

It is certified that error appears in the above-identified patent and that said Letters Patent is hereby corrected as shown below:

In the Claims

Column 10, Line 54, Claim 6: Please correct "first and end" to read -- first end --

Signed and Sealed this
Twenty-first Day of June, 2022

*Katherine Kelly Vidal*

Katherine Kelly Vidal
*Director of the United States Patent and Trademark Office*